United States Patent
Campagna

(10) Patent No.: US 7,388,494 B2
(45) Date of Patent: Jun. 17, 2008

(54) RFID SYSTEMS AND METHODS FOR PROBABALISTIC LOCATION DETERMINATION

(75) Inventor: Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 203 days.

(21) Appl. No.: 11/314,358

(22) Filed: Dec. 20, 2005

(65) Prior Publication Data
US 2007/0143072 A1 Jun. 21, 2007

(51) Int. Cl.
G06F 17/18 (2006.01)
G06F 15/00 (2006.01)
G06F 19/00 (2006.01)

(52) U.S. Cl. .................... 340/572.1; 702/181

(58) Field of Classification Search .. 340/568.1–572.9; 702/181
See application file for complete search history.

(56) References Cited

U.S. PATENT DOCUMENTS

| | | | | |
|---|---|---|---|---|
| 6,040,641 | A * | 3/2000 | Kim et al. .................. | 307/112 |
| 6,421,453 | B1 * | 7/2002 | Kanevsky et al. .......... | 382/115 |
| 6,751,580 | B1 * | 6/2004 | Cope et al. ................. | 703/2 |
| 6,813,341 | B1 * | 11/2004 | Mahoney .................. | 379/88.01 |
| 7,053,830 | B2 * | 5/2006 | Krumm et al. ............. | 342/451 |
| 7,113,079 | B2 * | 9/2006 | Singh et al. ................ | 340/436 |
| 2004/0090333 | A1 * | 5/2004 | Wildman et al. .......... | 340/573.1 |
| 2004/0221237 | A1 * | 11/2004 | Foote et al. ................ | 715/700 |
| 2005/0075836 | A1 * | 4/2005 | Taylor ....................... | 702/181 |
| 2005/0105600 | A1 * | 5/2005 | Culum et al. .............. | 375/150 |
| 2005/0273201 | A1 | 12/2005 | Zukowski et al. ......... | 702/258 |
| 2005/0273291 | A1 | 12/2005 | Zukowski et al. ......... | 702/127 |
| 2005/0273715 | A1 | 12/2005 | Zukowski et al. ......... | 715/708 |
| 2007/0077987 | A1 * | 4/2007 | Gururajan et al. ......... | 463/22 |

OTHER PUBLICATIONS

Rabiner, L.R., A Tutorial on Hidden Markov Models and Selected Application in Speech Recognition, Proceeding of the IEEE, vol. 77, No. 2 Feb. 1989, pp. 257-286.

* cited by examiner

Primary Examiner—Benjamin C. Lee
Assistant Examiner—Jennifer Mehmood
(74) Attorney, Agent, or Firm—George M. Macdonald; Angelo N. Chaclas

(57) ABSTRACT

Systems and methods for probabilistic determination of real world events in a sensory environment such as a predicting location in a responsive environment are described. A responsive environment system includes a set of sensors for making probabilistic observations of RFID sensor tags. The system also includes a control system employing a set of possible real world events and statistical processing system for predicting a particular real world event state based upon the sensor observations. In one configuration, a Hidden Markov Model is used for the statistical processing system and may be updated based upon the prediction of the model. The responsive environment will then launch a response based upon the predicted real world event state.

19 Claims, 3 Drawing Sheets

RFID SYSTEMS AND METHODS FOR PROBABALISTIC LOCATION DETERMINATION

FIELD OF THE INVENTION

The present invention relates to a method and system for estimating the probability of a particular real world state based on probabilistic observations of a time sequence of sensor observations and more particularly to using a Hidden Markov Model system in a responsive environment to predict real world events such as a person's activity based upon sensor readings such as Radio Frequency Identification system (RFID) readings.

BACKGROUND

RFID systems are well known and include passive and active RFID tags along with associated communications equipment and control systems. Each tag typically includes information that at least identifies the tag uniquely in some universe of tags. In the simplest systems, each sensor detects those tags that are within range and communicates the tag identities, and possibly other information such as a sensor reading timestamp, to a control system that then initiates an appropriate response. Details of the operation of RFID systems are well known in the art and further description is not believed necessary for an understanding of the subject invention.

More complex RFID systems locate tags more precisely by measuring the distance from sensors to tags or by triangulation. Other systems such as active badge systems sense tags using different technology such as infrared radiation or ultrasonic sound. As used herein the terms RFID tag and RFID system are intended to include such tags and systems unless otherwise indicated.

RFID systems have proven very successful. They are used in security systems such as corporate ID badges that provide access in buildings. Additionally, they have proven of great value in inventory control applications and are excellent systems for tracking what comes into and what comes out of a warehouse. Furthermore, the well-known EZ Pass® system uses RFID systems at tollbooths to read tags affixed to vehicles and charge tolls to corresponding accounts. Furthermore, responsive environment systems using RFID tags have been described such as the Pitney Bowes ATIRA responsive environment. However, RFID systems are limited in that sensors have limited in range and do not function reliably through walls or other barriers or partitions. Thus in many cases the sensors provide only probabilistic observations of the state. For example, a sensor located at the entrance to a room may be unable to distinguish among tags entering the room, tags leaving the room, and tags passing by the entrance.

Thus it is an object of the subject invention to provide a method and system for predicting, recording and tracking real world states in an RFID system based upon sensor observations such as probabilistic observations of RFID tags.

SUMMARY OF THE INVENTION

Systems and methods for probabilistic determination of activity such as the location of a person or item in a responsive environment are described. A responsive environment system includes a set of sensors for making probabilistic observations of RFID sensor tags. The system also includes a control system employing a set of possible real world events and statistical processing system for predicting a particular real world event state based upon the sensor observations. In one configuration, a Hidden Markov Model is used for the statistical processing system. The responsive environment will then launch a response based upon the predicted real world event state.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Systems and methods for probabilistic determination of real world events in a sensory environment such as an RFID based responsive environment for predicting location of a person or item are described. A responsive environment system includes a set of sensors for making probabilistic observations of RFID sensor tags. The system also includes a control system employing a set of possible real world events and statistical processing system for predicting a particular real world event state based upon the sensor observations. In one configuration, a Hidden Markov Model is used for the statistical processing system. The responsive environment may then launch a response based upon the predicted real world event state. Accordingly, the methods and systems described solve the problem of accurately predicting, recording and tracking real world events in a tagged environment. In the illustrative embodiment, observations at sensors are the only automated input to the system and the sensor events only record that a tag was near the sensor.

Research departments at various educational institutional and commercial enterprises have described several prototype responsive environments including the prototype ATIRA responsive environment described by Pitney Bowes of Stamford Conn. However, many such systems have had various limitations in capability and frequently are described as having imperfect location processing systems. In such systems, sensor observations might be misinterpreted and real world event states misreported.

Accordingly, the illustrative embodiments of the present application utilize statistical systems to improve real world event prediction accuracy such as location prediction accuracy in a responsive environment. Illustrative examples of responsive environment systems for determining location by implication are described in commonly owned, co-pending U.S. patent application Ser. No. 10/710,294, filed Jun. 30, 2004 by Zukowski, et al., which is incorporated herein by reference in its entirety. The methods and systems described herein may alternatively be applied to the embodiments described in the application referenced above. Hidden Markov Models (HMM) are mathematical tools applied to many classes of problems including financial modeling and speech recognition. An HMM is often an optimal model of a class of real world events. Lawrence R. Rabiner describes the Hidden Markov Model in "A Tutorial on Hidden Markov Models and Selected Applications in Speech Recognition," Proc. IEEE, Vol. 77, No. 2, February 1989 at pages 257-286, which is incorporated herein by reference.

Figure 1:
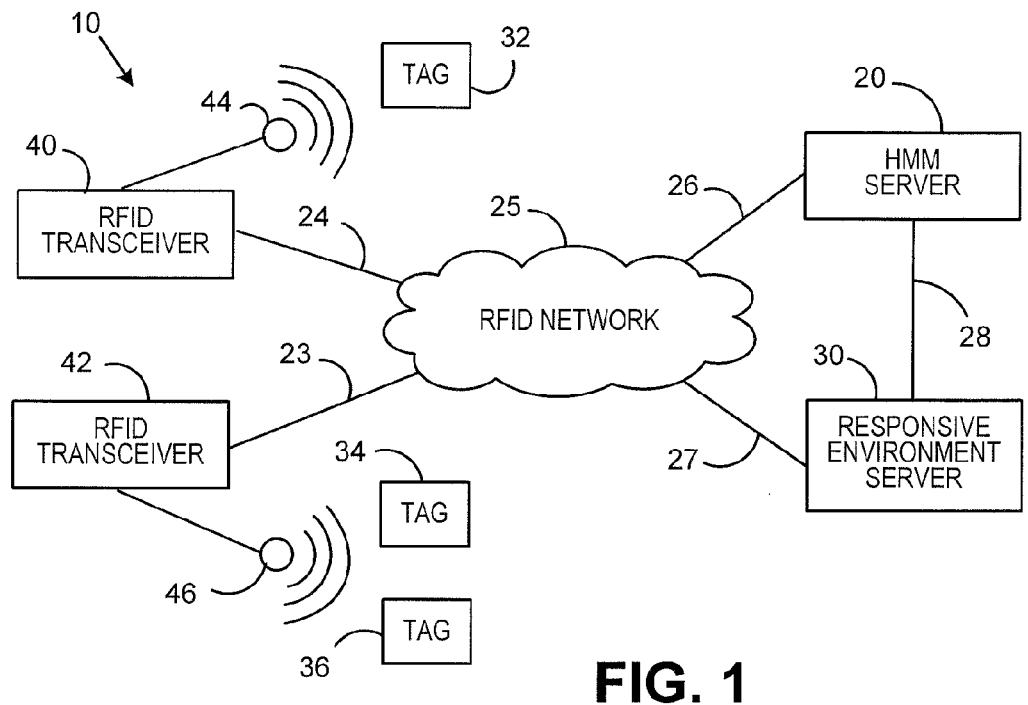
FIG. 1 is a block diagram of an illustrative configuration of a responsive environment system for providing accurate prediction of real world events according to one embodiment of the present application.

Referring to FIG. 1, a block diagram of an illustrative configuration of a responsive environment system 10 for providing accurate prediction of real world events according to one embodiment of the present application is shown. The system 10 provides an illustrative configuration with a minimal configuration for purposes of simplicity of description and clarity. In an RFID tag based responsive environment, people, items, documents, equipment and the like are tagged with RFID tags 32, 34, 36. As is known in the art, such system may use passive tags, active tags or a combination of passive and active tags. Here, RFID transceivers 40, 42 are connected to RFID sensor antennas 44, 46 and typically include one transceiver channel per antenna.

The RFID transceivers are connected to a responsive environment network 25 in this case that includes wired connections 23, 24, but that could alternatively include wireless connections. The responsive Environment server 30 and the HMM server 20 are also connected to the network 25 and each other using wired connections 26, 27, 28. Alternatively, the connections may be wireless and the two servers may coexist in the same computer. As can be appreciated from FIG. 1, when tag 32 is located near sensor 44, it will be detected by the RFID transceiver and the sensor data reported. Similarly, tags 34 and 36 are in range of sensor antenna 46.

Figure 2:
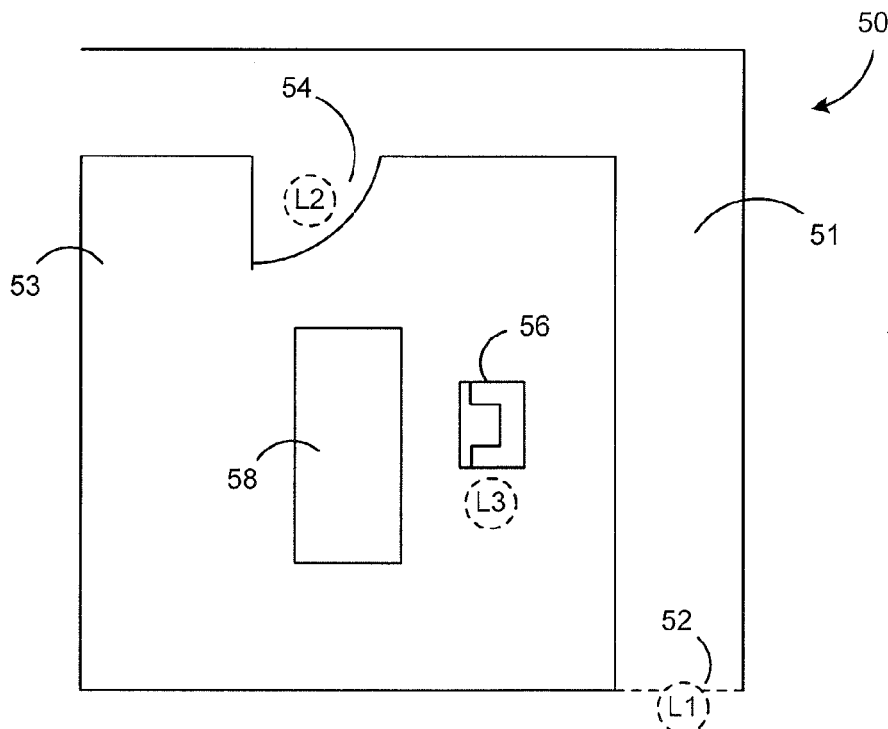
FIG. 2 is a block diagram of a portion of an illustrative configuration of a responsive environment system for providing accurate prediction of real world events according to the embodiment of FIG. 1.

Referring to FIG. 2, a block diagram of a portion 50 of an illustrative configuration of a responsive environment system for providing accurate prediction of real world events according to the embodiment of FIG. 1 is shown. The environment 50 includes an office hallway 51 having an entry point 52 denoted as location 1 or L1. The hallway 51 includes an office doorway 54 denoted as location 2 or L2. The office 53 includes a desk 58 and chair 56. The chair 56 is located at location 3 or L3.

In the illustrative responsive environment shown, a Hidden Markov Model can be defined to mathematically model the real world events W at a series of times t against the sensor observations O.

S=the set of all possible states, denoted $S_i$ for i=0, ... m−1. Then we can consider the state transition coefficients $a_{ij}$=Pr$(W_{t+1}=S_j|W_t=S_i)$ as the probability that the system is in state $S_i$ at time t and transitions to state $S_j$ at time t+1. We note that $a_{ij} \geq 0$, and $\Sigma a_{ij}$=1, the sum over j's for a fixed i. Then, each state is observed in the responsive environment, denoted as $O_t$ at time t. In a perfect world, observation $O_t$ would be a clear un-obstructive observation of the state value $S_i$. For many real world application, specifically responsive environments, observations are not unobstructive. We will denote these observations as V=the set of all possible observations $V_i$ for i=0, ... , n−1. We can then consider $b_j(k)$=Pr$(O_t=V_k|W_t=S_j)$. A typical distribution will have the property $b_j(k) \geq 0$ such that $\Sigma_{k=0}^{n} b_j(k)$=1. We let $\pi_i$=Pr$(W_o=S_i)$ be the probability that initial state is $S_i$. These three probability distributions and the associated states and observations define a Hidden Markov Model (HMM) Λ=(S, V, A, B, π).

One problem in HMM is given the model Λ, what is the probability of seeing the observation sequence O=$O_o$, $O_1$, ... $O_T$. Start with considering all possible state sequences W=$W_o$, $W_1$, ... $W_T$. So we have:

$$Pr(O|W, \Lambda)=\Pi_{t=0}^{T} p(O_t|W_t, \Lambda)=\Pi_{t=0}^{T} b_{Wt}(O_t).$$

Now we also have to consider the probability of W given Λ. This can be computed as:

$$Pr(W|\Lambda)=\pi_{Wo} a_{Wo, W1} a_{W1, W2} \cdots a_{WT-1, WT}.$$

So, Pr(O, W|Λ)=Pr(O|W, Λ)Pr(W|Λ), and finally we have:

$$Pr(O|\Lambda)=\Sigma_{W \text{ of length } T} Pr(O, W|\Lambda).$$

The above expression of the HMM problem is potentially a huge computation and is a calculation that should be avoided. In particular it involves $2(T+1)m^{T+1}$ calculations. Therefore, if we are looking at 10 observations over a state size of 20 we are looking at $20^{10} \sim 2^{43}$ operations. Accordingly, to be practical, the method must use a more efficient method. The forward-backward procedure may be utilized and defines the forward variable:

$$\alpha_t(i)=P(O_0, O_1, \ldots O_t, W_t=S_i|\Lambda).$$

This can be computed inductively:

$$\alpha_o(i)=\pi_i b_i(O_0), \text{ for } 0 \leq i \leq m-1$$

Induction:

$$\alpha_{t+1}(j)=(\Sigma_{i=i}^{m-1} \alpha_t(i) a_{ij}) b_j(O_{t+1}), \text{ for } 0 \leq t \leq T-1, 0 \leq j \leq m-1$$

Terminate:

$$P(O|\Lambda)=\Sigma_{i=0}^{m-1} \alpha_T(i).$$

TABLE 1

| | t = 0 | t = 1 | ... | t = t | t = t + 1 | |
|---|---|---|---|---|---|---|
| Real World => | $W_0$ | => $W_1$ | ... => | Wt | => $W_{t+1}$ | => ... |
| | V | V | | V | V | |
| Observation => | $O_0$ | => $O_1$ | ... => | $O_t$ | => $O_{t+1}$ | => ... |

Considering Table 1, any sequence of observations O in an RFID environment can be interpreted using a Hidden Markov Model to predict real world states W.

If $W_t$ represents the state of the real world at time t, we can assume a Markov Model for the real world. Initially, we let The details of the HMM model described are also shown in the article by Rabiner described above.

A similar construction is used to build a backward variable:

$$\beta_t(i)=Pr(O_{t+1}, O_{t+2}, \ldots, O_T|W_t=S_i, \Lambda).$$

And again $\beta_t(i)$ can be computed inductively:

$\beta_T(i)=1$, for $0 \leq i \leq m-1$

Induction:

$\beta_t(i)=\Sigma_{j=0}^{m-1} a_{ij} b_j(O_{t+1}) \beta_{t+1}(j)$, $t=T-1, T-2, \ldots, 0$
and $0 \leq i \leq m-1$.

Another problem in HMM is when the observations $O_t$ are seen but the true states remain hidden Wt. In this case it makes sense to ask the question seeing observation sequence $O=O_0, O_1, \ldots O_k$ what is the probability of $W_t=S_i$. For this end we define:

$\gamma_t(i)=Pr(W_t=S_i|O, \Lambda)$.

This can be computed using the forward and backward variables:

$\gamma_t(i)=\alpha_t(i)\beta_t(i)/P(O|\Lambda)=\alpha_t(i)\beta_t(i)/\Sigma_{i=0}^{m-1}\alpha_t(i)\beta_t(i)$.

It is routine to verify that $\gamma_t(i)$ is a probability measure such that:

$\Sigma_{i=0}^{m-1}\gamma_t(i)=1$.

Using $\gamma_t(i)$, we can solve for the individually most likely state $W_t$ at time t $W_t=S_i$ where argmax $\{\gamma_t(i)\}_{i=0}^{m-1}$, for each $0 \leq t \leq T$.

The above equation will maximize the number of correct states, since it selects the most likely state for each time t. It might not however produce the most likely sequence of events. For instance there may be a state transition coefficient $a_{ij}=0$, but the above formula gives $W_{t+1}=S_j$ and $W_t=S_i$, an invalid state transition. To correct for this we can then ask what optimizes the number of correct pairs $(W_t, W_{t+1})$ or sequence of states $(W_t, W_{t+1}, \ldots, W_{t+1})$. The general problem seems to solve most specific applications needs; and that is to find the optimal state sequence $W=W_0, W_1, \ldots W_T$, or most likely state sequence, given the observations $O=O_1, O_2, \ldots, O_T$.

The quantity:

$\delta_t(i)=\max Pr(W_0, W_1, \ldots, W_t=S_i|O_1, \ldots O_t, \Lambda)_{W_0, W_1, \ldots W_{t-1}}$.

Now, $\delta_t(i)$ is the highest scoring value along a path at time t that ends at state $S_i$ and accounts for the observations $O_0, O_1, \ldots, O_t$. That is if we start at time 0, we have the most probable path to a state $S_i$ does not exactly make sense but we can state:

$\delta_0(i)=\pi_i b_i(O_0)$

By induction we have:

$\delta_{t+1}(j)=[\max \delta_t(i)a_{ij}]_{i=0}^{m-1} b_j(O_{t+1})$.

To record the state information we need to keep track of the argument i which maximizes this function for each t and j. This is done via an array $\psi_t(j)$. This will give us a complete procedure for computing the best state sequence as follows:

Initialization:

$\delta_o(i)=\pi_i b_i(O_0)$ $0 \leq i \leq m$ $\psi_o(j)=0$

Recursion:

$\delta_t(j)=\max[\delta_{t-1}(i)a_{ij}]_{i=0}^{m-1} b_j(O_t)$, for $0 < t \leq T$, and $0 \leq j < m$ $\psi_t(j)=\text{argmax}[\delta_{t-1}(i)a_{ij}]_{i=0}^{m-1}$ for $0 < t \leq T$, and $0 \leq j < m$.

Termination:

$P^*=\max[\delta_T(i)]_{i=1}^{m-1}$ $W_T^*=S_i$ where $\text{argmax}[\delta_T(i)]_{i=0}^{m-1}$ Path:

$W_t^*=\psi_{t+1}(W_{t+1}^*)$ for $t=T-1, T-2, \ldots, 0$.

We now define a model for an environment where documents and people are identified at location sensors. We use the notation $I=\{I_0, I_1, \ldots, I_{s-1}\}$ as the set of known identities and $D=\{D_0, D_1, \ldots, D_{r-1}\}$ as the set of known documents and $L=\{L_0, L_1, \ldots, L_{l-1}\}$ the set of sensor locations. Admittedly considerable notation and quantization of the states of such a system needs to be carefully considered. We over simplify states and transitions to demonstrate the concept. A real world event occurs when any of the sensor locations $L_h$ are triggered. The triggering is caused by the proximity sensing of a document or an identity. Let's start with a simple example. Suppose a door portal location $L_h$ senses identity $I_k$ at time t. This is the observation $L_h$ sees $I_k$ or $O_t=(I_k \epsilon L_k)$; we can think of this as $I_k$ is in the neighborhood of $L_k$. This can be the result of a number of real world events as shown in Table 2.

TABLE 2

| | Possible Real World Events |
|---|---|
| 1 | $I_k$ walks into room through $L_h$, $(I_k \rightarrow L_h)$, |
| 2 | $I_k$ walks out of room through $L_h$ $(I_k \leftarrow L_h)$ |
| 3 | $I_k$ walks near $L_h$ portal inside room $(I_k << L_h)$ |
| 4 | $I_k$ walks near $L_h$ portal outside room $(I_k >> L_h)$ |

To understand this event in others we need to think about some basic laws of our real world system. Let's suppose that $L_h$ is the only portal for entering a room, in this case, clearly $W_t=I_k \leftarrow L_h$ is only possible if $W_{t-v}=I_k \rightarrow L_h$ for some time prior to t. We might have then:

$b_{(I_k \rightarrow L_h)}(I_k \epsilon L_h)=Pr(I_k \epsilon L_k|I_k \rightarrow L_h)=1$.

Now also suppose that there is another sensor location $L_{h+1}$ in the room; and at time t+1, $L_{h+1}$ sees $I_k$. This results in $O_{t+1}=(I_k \epsilon L_{h+1})$. We now have a sequence of observations: $O_0 \rightarrow O_1 \rightarrow \ldots \rightarrow O_t \rightarrow O_{t+1}$, and let's suppose that $O_{t-s} \neq (I_k \epsilon L_h)$ for $0 < s < t$. Now we can make the following claim on our environment:

$W_t=(I_k \rightarrow L_h)$ is followed by $W_{t+1}=(I_k \epsilon L_{h+1})$.

Before continuing with this example, we define some encoding methods for states and observations, as well as a method for recording them. Initially, we allow observations to be encoded and stored in a database. Then, at every time t, a location can make multiple readings of identities and documents passing through, these can be recorded directly into the database in record format such as shown in Table 3.

TABLE 3

| Entry_ID | Location_ID | Time | Tag_ID |
|---|---|---|---|
| 0000001 | 0000001 | 0000000 | I0000001 |
| 0000002 | 0000001 | 0000000 | D0000001 |
| 0000003 | 0000001 | 0000000 | I000002 |

The three entries above indication that identities $I_1$ and $I_2$ and document $D_1$ were are location $L_1$ at time 0.

Similarly we can encode real world events in record format as shown in Table 4.

TABLE 4

| Entry_ID | Location_ID | Time | Group_ID | Tag_ID | Event_ID |
|---|---|---|---|---|---|
| 0000001 | 0000001 | 0000000 | 0000001 | I0000001 | 0000001 |
| 0000002 | 0000001 | 0000000 | 0000001 | D0000001 | 0000001 |
| 0000003 | 0000001 | 0000000 | 0000002 | I0000002 | 0000001 |

Table 4 indicates that $I_1$ carrying document $D_1$ entered room $L_1$ with identity $I_2$, previous written $W_0=((I_1, D_1), D_2 \rightarrow L_1)$, where the Group_ID represents a grouping, and Event_ID indicates an action, enter, exit, walked by inside, walked by outside, was near, and so forth.

The above framework provides a method of recording observations and real world events that can be easily extended for more robust descriptions. The next thing we need to describe is how to describe our HMM, and how to use it to best populate our real world event records. To build meaningful statistics we need to scope out our Event_ID table. A rudimentary, but illustrative table of possible real world events is shown in Table 5.

TABLE 5

| Event_ID | Description |
|---|---|
| 0000001 | Entered through room portal |
| 0000002 | Exited through room portal |
| 0000003 | Walked by Inside room portal |
| 0000004 | Walked by Outside room portal |
| 0000005 | Walked through gateway direction 1 |
| 0000006 | Walked through gateway direction 2 |
| 0000007 | Placed on surface |
| 0000008 | Removed from surface |
| 0000009 | Placed in item |
| 000000A | Removed from item |
| 000000B | Is near |

Given the above framework and example, we are able to consider in the limited illustrative real world responsive environment the state transition coefficients of events. For instance we know that event ID 0000002 can only occur after the event ID 0000001, since something must enter a room before it can exit. Similarly we might say a document must enter a room ($D_1 \rightarrow L_1$) before it can be place on a surface in that room ($D_1$ on $S_1$). This implies we have some definite zero transition coefficients. Other transition coefficients can be assumed equal. Alternatively, and most likely optimally, these transition coefficients can be updated or computed from the real world events table, and inherent known features of the system to give better results.

It would be useful to limit the plausible real world events around our observation. This is not necessarily trivial based upon the environment, but the illustrative descriptions and teaching described here guide the user in applying the teachings of this application to the specifics of the environment. It would be computationally difficult to allow the real world events to be infinite. Initially, we refer to FIG. 2 that shows a simplistic small world partial responsive environment for purposes of simplicity of description and clarity. It has one identity $I_1$ and three locations $L_1$, $L_2$, $L_3$ that relate to the real world by the room diagram of FIG. 2. We allow for only the following subset of real world events in, out and near=(0000001, 0000002, 000000B) from the event ID Table 5.

We initially suppose that on most days, in the real world, Bob ($=I_1$) walks through portal L1, L2, and then sits in his chair L3. However, sometimes Bob walks through L1, and reaches L2 but then realizes he has forgotten something in his car, and so never enters the office, or sits in the chair, and walks out passed $L_1$ again. In these two cases we have the following real world events $\{E_{t1}=(I_1 \rightarrow L_1), E_{t2}=(I_1 \rightarrow L_2), E_{t3}=(I_1 \epsilon L_3)\}$; and $\{E_{t4}=(I_1 \rightarrow L_1), E_{t5}=(I_1 \epsilon L_2), E_{t6}=(I_1 \leftarrow L_1)\}$. This is recorded in the observation tables as shown in Table 6.

TABLE 6

| Entry_ID | Location_ID | Time | Tag_ID |
|---|---|---|---|
| ... | ... | ... | ... |
| Event for $E_{t1}$ | 0000001 | t1 | I0000001 |
| ... | ... | ... | ... |
| Event for $E_{t2}$ | 0000002 | t2 | I0000001 |
| ... | ... | ... | ... |
| Event for $E_{t3}$ | 0000003 | t3 | I0000001 |
| ... | ... | ... | ... |
| Event for $E_{t4}$ | 0000001 | t4 | I0000001 |
| ... | ... | ... | ... |
| Event for $E_{t5}$ | 0000002 | t5 | I0000001 |
| ... | ... | ... | ... |
| Event for $E_{t6}$ | 0000001 | t6 | I0000001 |

Such an example would be recorded in the real world observation table shown in Table 7.

TABLE 7

| Entry_ID | Location_ID | Time | Group_ID | Tag_ID | Event_ID |
|---|---|---|---|---|---|
| ... | ... | ... | ... | ... | ... |
| $E_{t1}$ | 0000001 | t1 | 0000001 | I0000001 | 0000001 |
| ... | ... | ... | ... | ... | ... |
| $E_{t2}$ | 0000002 | t2 | 0000001 | I0000001 | 0000001 |
| ... | ... | ... | ... | ... | ... |
| $E_{t1}$ | 0000003 | t3 | 0000001 | I0000001 | 000000B |
| ... | ... | ... | ... | ... | ... |
| $E_{t1}$ | 0000001 | t4 | 0000001 | I0000001 | 0000001 |
| ... | ... | ... | ... | ... | ... |
| $E_{t1}$ | 0000002 | t5 | 0000001 | I0000001 | 000000B |
| ... | ... | ... | ... | ... | ... |
| $E_{t1}$ | 0000001 | t6 | 0000001 | I0000001 | 0000002 |

When we consider all the possible real world events in our model as the set $S=\{S_i\}$ we have the states shown in Table 8.

TABLE 8

| State | = | |
|---|---|---|
| $S_0$ | $(I_1 \rightarrow L_1)$ | = {Location_ID = 0000001, Tag_ID = I0000001, Event_ID = 0000001} |
| $S_1$ | $(I_1 \rightarrow L_1)$ | = {Location_ID = 0000001, Tag_ID = I0000001, Event_ID = 0000002} |
| $S_2$ | $(I_1 \epsilon L_1)$ | = {Location_ID = 0000001, Tag_ID = I0000001, Event_ID = 000000B} |

TABLE 8-continued

State =

| | | |
|---|---|---|
| $S_3$ | $(I_1 \rightarrow L_2) =$ | {Location_ID = 0000002, Tag_ID = I0000001, Event_ID = 0000001} |
| $S_4$ | $(I_1 \rightarrow L_2) =$ | {Location_ID = 0000002, Tag_ID = I0000001, Event_ID = 0000002} |
| $S_5$ | $(I_1 \in L_2) =$ | {Location_ID = 0000002, Tag_ID = I0000001, Event_ID = 000000B} |
| $S_6$ | $(I_1 \in L_3) =$ | {Location_ID = 0000003, Tag_ID = I0000001, Event_ID = 000000B} |

We can now select all the entries with Tag_ID=I000001, this creates a list of entries ordered by time. We can then take this time ordered list and begin to compute basic probabilities. In the obvious way $a_{ij}$=# times $S_j$ occurs directly after $S_i$/# of times $S_i$ occurs. In this way we build A of our Markov Model of the real world. For event transitions that are not possible, i.e. $S_0$ followed directly by $S_6$ we might develop a theory of reader error. Suppose there is a probability $\rho$ that any reader fails to read. Then we might make $a_{0,6}=\rho$. Similarly if we might consider $S_1$ followed by $S_6$ and notice that this would require two read failures, a probability $a_{1,6}=\rho^2$. We note that this may require us to revisit the $a_{ij}$'s calculated above to that the basic principals of a Markov Model hold, namely $\Sigma a_{ij}=1$, the sum over j's for a fixed i. Similarly we have the following possible observation set $V=\{V_j\}$ defined in our model, where:

$V_0=I_1 \in L_1=\{0000001, I000001\}$ read identity 1 was read by location sensor 1, $V_1=I_1 \in L_2=\{0000002, I000001\}$ read identity 1 was read by location sensor 2, $V_2=I_1 \in L_3=\{0000003, I000001\}$ read identity 1 was read by location sensor 3.

We can then associate the probability of observations consider $b_j(k)=Pr(O_t=V_k|W_t=S_j)$=the probability that observation at time t is $V_k$ given the real world event at time t was $S_j$. This will produce the following simple $B=\{b_j(k)\}$ matrix shown in Table 9:

TABLE 9

| | | | |
|---|---|---|---|
| B = | 1 | 0 | 0 |
| | 1 | 0 | 0 |
| | 1 | 0 | 0 |
| | 0 | 1 | 0 |
| | 0 | 1 | 0 |
| | 0 | 1 | 0 |
| | 0 | 0 | 1 |

And since in our model we can control the initial condition probability $\pi_i=Pr(W_0=S_i)$. We now have constructed a HMM $\Lambda=(S, V, A, B, \pi)$ for our sensor environment. The model approach used has been shown to be highly effective in determining real world events when complex systems take the form of HMM and provides a mechanism here for more accurate determination of real world responsive environment states based upon observation data.

Figure 3:
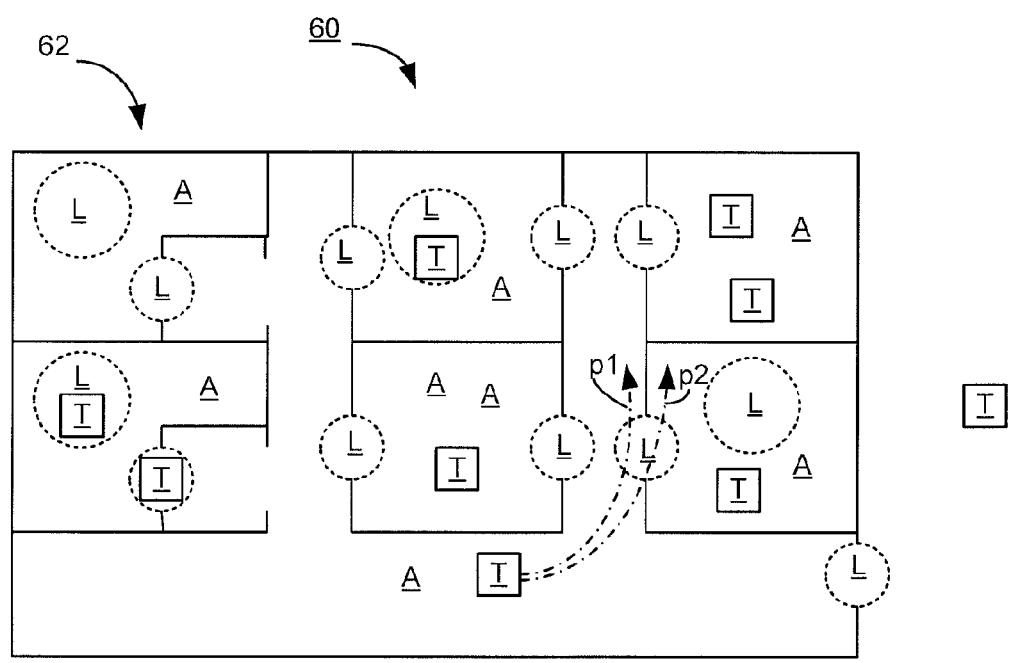
FIG. 3 is a block diagram of an illustrative configuration of a responsive environment system for providing accurate prediction of real world events according to another embodiment of the present application.

Referring to FIG. 3, a block diagram of an illustrative configuration of a responsive environment system 60 for providing accurate prediction of real world events according to another embodiment of the present application is shown. RFID system 60 is sued for tracking and recording real world states of people and objects that are tagged with RFID tags T. System 60 comprises a plurality of sensors that each generate a corresponding location L, and which detect the identity of ,and possibly other information relating to, each tag T within location L. Sensors SL correspond to locations L and communicate the detected identity through an appropriate receiver to an appropriate control system. The control system analyzes the information, i.e. observations, and initiates appropriate action in accordance with the particular application. System 60 typically also includes structure 62, which forms walls or barriers that partition the real world, i.e. the area of interest, into areas A and which restrict the motion of tags T. Note that areas A and locations L are disjoint and together cover the area of interest. Also note that the region outside of structure 62 comprises a distinct area A.

Real world states at time t $W_t$ take on values $S_i$, i=0, ... m−1, where each $S_i$ is defined by the identity of each tag within each location L and area A. Thus, for n(T) tags and n(A) areas and n(L) locations, $m=(n(A)+n(L))^{n(T)}$. Observations at time t $O_t$ take on values $V_k$, k=0. ... n−1, where each $V_k$ is defined by the identity of each tag within each location L; and, by implication, the identity of each tag not within any location L. Thus $n=(n(L)+1)^{n(T)}$. Thus m>n for n(A)>1 and observations $O_t$ are probabilistic and cannot fully specify states $W_t$. For example, in FIG. 1 it is not possible to immediately determine if a tag T has moved along path p1 or path p2, and whether the resulting state has changed or remained the same.

Hidden Markov Models (HMM) are known to give optimal solutions to systems where real world states are only probabilistically observable. The Control system is programmed to analyze observations $O_t$ using an HMM for system 60. In a system for recording and tracking real world states from probabilistic observations such as system 60 let:

W be a time sequence of states $\{S_i\}$=set S, for i=0, ... m−1, such that $W_t=S_i$, t=0, ... T;

O be a time sequence of observed values $\{V_k\}$=set V, for k=0, ... n−1, such that $O_t=V_k$, t=0, ... T;

the conditional probability $a_{ij}=Pr(W_{t+1}=S_j|W_t=S_i)$, and let A be the set of probabilities $\{a_{ij}\}$;

the conditional probability $b_i(k)=Pr(O_t=V_k|W_t=S_i)$, and let B be the set of probabilities $\{b_i(k)\}$; and the probability $\pi_i=Pr(W_0=S_i)$, and let $\pi$ be the set of probabilities $\{\pi_i\}$.

Then (S, V, A, B, $\pi$) define an HMM.

In an HMM the following relationships hold:

(1) $Pr(O, W)=\Pi_{t=0}^T Pr(O_t=V_k|W_t=S_i)=\Pi_{t=0}^T b_i(k)$;

(2) $Pr(W)=Pr(W_t=S_{i(t)})$; [for t=0, ... T], $=\pi_{i(0)}\Pi_{t=0}^{T-1} a_{i(t),j(t)}$; [for j(t)=i(t+1)];

(3) $Pr(O,W) = Pr(O|W)Pr(W)$;

(4) $Pr(O)=\Sigma_{all\ W} Pr(O, W)$; and finally (5) $Pr(W|O)=Pr(O, W)/Pr(O)=(\Pi_{t=0}^T b_i(k)) (\pi_{i(0)}\Pi_{t=0}^{T-1} a_{i(t),j(t)})/\Sigma_{all\ W}(\Pi_{t=0}^T b_i(k)) (\pi_{i(0)}\Pi_{t=0}^{T-1} a_{i(t),j(t)})$.

In the HMM sets S, V, and B are predetermined by system topology and user definition, preferably as described above, and set $\pi$ typically can be controlled by a user who can generally control, or determine a priori, the initial state probability distribution. Leaving set A to be determined. Generally, set A is not known but is constrained by structure 62. Since tags T cannot pass through walls certain state transitions are not possible and corresponding $a_{ij}$ can be determined to be equal to zero. Values for remaining probabilities $a_{ij}$ can be assumed equal or can be estimated from a priori knowledge; at least initially.

System timing also will affect probabilities $a_{ij}$. If system 60 is asynchronous, i.e. times t record the time at which state transitions occur, as indicated by a change in observation values, than null state transitions are not possible and probabilities $a_{i,i}$ equal zero. In synchronous systems a state can remain unchanged through successive time periods and values for probabilities $a_{i,i}$ also need to be determined.

Figure 4:
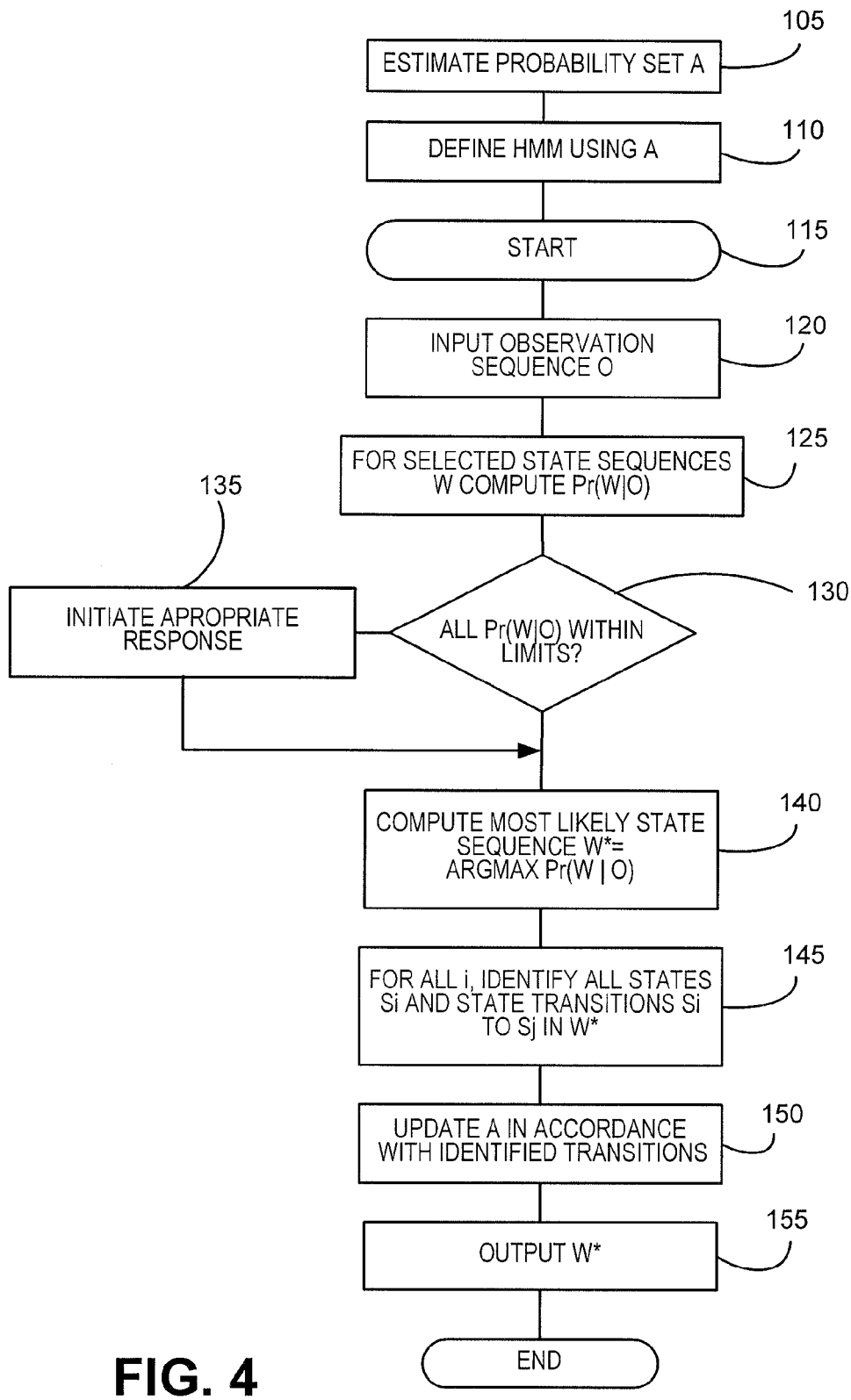
FIG. 4 is a flowchart showing a method for predicting real world event states in a responsive environment using a Hidden Markov Model according to one embodiment of the present application.

Referring to FIG. 4, a flowchart showing a method for predicting real world event states in a responsive environment using a Hidden Markov Model according to one embodiment of the present application is shown with reference to the system 60.

Initially, at step 105 estimates are generated for conditional state transition probabilities $a_{i,j}$. As noted above some values are determined as 0 by the topology of system 60 and possibly other constraints. In one embodiment of the subject invention the remaining state transitions are taken to be equally probable. In another embodiment a priori estimates are made for the state transition probabilities; subject to the constraint that: for all i, $\Sigma_j a_{ij}=1$.

At step 110 elements S, V, B, and $\pi$ are determined in accordance with the structure and application of system 60 to define the HMM. In one embodiment, where S and V are determined as described above, conditional probabilities $b_i(k)$ are bimodal, equal to 0 or 1; assuming normal operation of sensors SL. (Note that different determination of S and V can result in different distribution of $b_i(k)$, $0<b_i(k)<1$. This may tradeoff a smaller number of states $S_i$ for a more problematic determination of $b_i(k)$.)

After system 60 is initialized 115, at step 120 observation sequence O, for time=0, . . . T, is input. Successive sequences can be chosen to represent blocks of time that are contiguous, separate or overlapping, and may vary in length depending upon particular applications. Determination of an appropriate choice for a particular application is within the ability of those skilled in the art and need not be discussed further for an understanding of the subject invention.

At step 125 Pr(W|O), the probabilities for certain preselected state sequences W, given observation sequence O, are computed as shown above and the HMM. In particular applications a response can be necessary if the probability of certain pre-identified undesirable state sequences, or groups of sequences, exceeds a predetermined threshold, or, conversely, if the probability of certain pre-identified desirable state sequences, or groups of sequences, falls below a predetermined threshold. Accordingly, at step 130, system 60 determines if probabilities for pre-selected sequences W are within predetermined limits, and, if not goes to step 135 to take appropriate action; the exact nature of which depends upon the particular application and forms no part of the subject invention per se.

At step 140 system 60 computes the most likely sequence W*, i.e. W such that Pr(W|O) is maximal=argmaxPr(W|O). Then at step 145, for all i, system 60 identifies all $S_{i(t)}$ and all transitions $S_{i(t)} \to S_{i(t+1)}$. Then at step 150, system 60 computes the ratios: $n(S_{i(t)} \to S_{j(t)})/n(S_{i(t)})$, t=0, . . . T; and then uses these ratios to update the initial estimates for $\{a_{ij}\}$ in a convenient manner. The ratios can be used to replace the initial estimates or can be combined with the initial estimates in an appropriately weighted average. The computed ratios can also be "windowed", i.e. older ratios can be discounted or discarded, before being combined with initial estimates. In general a person skilled in the art can select an appropriate method for updating set A in accordance with particular applications and details of the particular method form no part of the subject invention per se. Then at step 155, system 60 outputs W* for such use as is appropriate for a particular application.

Those skilled in the art will recognize that a straightforward computation of W* increases rapidly with sequence length T and the number of states m; requiring on the order of $2(T+1)m^{T+1}$ calculations. Accordingly, it may be preferable to utilize a more efficient algorithm such as described above.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for determining a real world event in a sensory environment comprising:
   receiving a series of sensory inputs;
   using a present state of a statistical model to compute a most likely sequence of real world events that would produce the received series of sensory inputs;
   updating the statistical model to an updated state using the computed most likely sequence of real world events; and
   outputting the computed most likely sequence of real world events determining if a response includes an immediate response event; and if the response includes an immediate response event, initiating the immediate response event before updating the statistical model.

2. The method of claim 1, further comprising:
   determining an appropriate response of the sensory environment based upon the computed most likely sequence of real world events.

3. The method of claim 2, further comprising:
   initiating the appropriate response.

4. The method of claim 3, wherein:
   the statistical model is a Hidden Markov Model.

5. The method of claim 4, wherein:
   the sensory environment includes an RFID responsive environment having a plurality of RFID tags and a plurality of RFID sensors.

6. The method of claim 5, wherein:
   the series of sensory inputs includes RFID sensor data.

7. The method of claim 6, wherein:
   the RFID sensor data includes an indication that at least one of the RFID tags is present in a field of view of at least one of the RFID sensors; and
   the response comprises launching an application on a computer.

8. The method of claim 7, wherein:
   the statistical model is updated to the updated state after ten sensory inputs.

9. The method of claim 6, wherein:
   the sequence of real world events includes an item placed on a surface.

10. The method of claim 6, wherein:
    the sequence of real world events includes a person entering a room.

11. The method of claim 6, wherein:
    the sequence of real world events includes a person passing by a room.

12. The method of claim 4, wherein:
the Hidden Markov Model utilizes a forward-backward procedure.

13. The method of claim 4, wherein:
the Hidden Markov Model utilizes at least one definite zero transition coefficient to optimize the model.

14. The method of claim 4, wherein:
the Hidden Markov Model utilizes a controlled initial condition probability.

15. A method for determining a real world event in a sensory environment comprising:
receiving a series of sensory inputs;
using a present state of a statistical model to compute a most likely sequence of real world events that would produce the received series of sensory inputs;
updating the statistical model to an updated state using the computed most likely sequence of real world events;
outputting the computed most likely sequence of real world events;
determining an appropriate response of the sensory environment based upon the computed most likely sequence of real world events;
initiating the appropriate response, wherein:
the statistical model is a Hidden Markov Model,
the sensory environment includes an RFID responsive environment having a plurality of RFID tags and a plurality of RFID sensors,
the series of sensory inputs includes RFID sensor data,
the RFID sensor data includes an indication that at least one of the RFID tags is present in a field of view of at least one of the RFID sensors,
the response comprises launching an application on a computer,
the statistical model is updated to the updated state after ten sensory inputs; and further comprising:
determining if the response includes an immediate response event; and
if the response includes an immediate response event, initiating the immediate response event before updating the statistical model.

16. A method for determining real world events including a location of at least one item in a sensory environment comprising:
receiving a series of sensory inputs associated with location information including at least one sensory input associated with the at least one item;
using a present state of a Hidden Markov Model to compute a most likely sequence of real world events that would produce the received series of sensory inputs;
updating the Hidden Markov Model to an updated state using the computed most likely sequence of real world events; and
outputting the computed most likely sequence of real world events comprising location information associated with the at least one item determining if a response includes an immediate response event; and if the response includes an immediate response event, initiating the immediate response event before updating the Hidden Markov Model.

17. The method of claim 16, further comprising:
determining an appropriate response of the sensory environment based upon the computed most likely sequence of real world events.

18. The method of claim 17, further comprising:
initiating the appropriate response, wherein:
the sensory environment includes an RFID responsive environment having a plurality of RFID tags and a plurality of RFID sensors; and
the series of sensory inputs includes RFID sensor data.

19. The method of claim 16, wherein, the sequence of real world events includes a person passing by a room.

* * * * *